(12) United States Patent
Neerincx et al.

(10) Patent No.: US 10,936,591 B2
(45) Date of Patent: Mar. 2, 2021

(54) IDEMPOTENT COMMAND EXECUTION

(75) Inventors: Matthew A. Neerincx, Sammamish, WA (US); Luiz F. Santos, Lynnwood, WA (US); Oleg Ignat, Bellevue, WA (US); David B. Lomet, Redmond, WA (US); Quetzalcoatl Bradley, Monroe, WA (US); Raghu Ram, Redmond, WA (US); Peter Gvozdjak, Bellevue, WA (US); Balendran Mugundan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 537 days.

(21) Appl. No.: 13/471,670

(22) Filed: May 15, 2012

(65) Prior Publication Data
US 2013/0311525 A1    Nov. 21, 2013

(51) Int. Cl.
*G06F 16/2455*    (2019.01)
*G06F 16/23*      (2019.01)

(52) U.S. Cl.
CPC ...... *G06F 16/2455* (2019.01); *G06F 16/2358* (2019.01)

(58) Field of Classification Search
USPC ........................................................ 707/825
See application file for complete search history.

(56) References Cited

U.S. PATENT DOCUMENTS 5,826,085 A    10/1998  Bennett et al.
5,951,694 A *   9/1999  Choquier et al. ............... 714/15
(Continued)

FOREIGN PATENT DOCUMENTS

CN    1905557 A    1/2007
CN    1955967 A    5/2007
(Continued)

OTHER PUBLICATIONS

Wilbur, et al., "Building distributed systems with remote procedure call", Retrieved at <<http://ieeexplore.ieee.org/stamp/stamp.jsp?tp=&arnumber=4807901>> Proceedings: Software Engineering Journal, Sep. 1987, p. 148-159.
(Continued)

*Primary Examiner* — Muluemebet Gurmu
(74) *Attorney, Agent, or Firm* — Fiala & Weaver P.L.L.C.

(57) ABSTRACT

Systems and methods are described that facilitate idempotent execution of commands generated by a client for execution by a database server. Each command transmitted to the server includes a command ID generated by the client. The server attempts to execute each command and subsequently stores the command ID associated therewith in a repository along with an indication of whether the command executed successfully. When a new command is received by the server, it determines if the command ID associated therewith has already been stored in the repository. If the command ID associated with the new command has not already been stored in the repository, then the server executes the new command. If the command ID associated with the new command has already been stored in the repository and a previously-received command associated with the command ID has been executed successfully, then the server will not execute the new command.

20 Claims, 10 Drawing Sheets

(56) References Cited

U.S. PATENT DOCUMENTS

| | | | |
|---|---|---|---|
| 5,960,436 A | 9/1999 | Chang et al. | |
| 6,088,728 A * | 7/2000 | Bellemore | H04L 29/12924 |
| | | | 709/225 |
| 6,182,086 B1 | 1/2001 | Lomet et al. | |
| 6,199,110 B1 | 3/2001 | Rizvi et al. | |
| 6,314,455 B1 | 11/2001 | Cromer et al. | |
| 6,381,617 B1 | 4/2002 | Frolund et al. | |
| 6,453,354 B1 * | 9/2002 | Jiang et al. | 709/229 |
| 6,463,459 B1 * | 10/2002 | Orr et al. | 709/203 |
| 6,539,494 B1 | 3/2003 | Abramson et al. | |
| 6,704,778 B1 * | 3/2004 | Horman | 709/220 |
| 6,778,653 B1 | 8/2004 | Kallas et al. | |
| 6,801,914 B2 | 10/2004 | Barga et al. | |
| 6,820,085 B2 | 11/2004 | Nishizawa et al. | |
| 7,231,636 B1 | 6/2007 | Evans | |
| 7,284,155 B2 | 10/2007 | Faihe et al. | |
| 7,343,515 B1 | 3/2008 | Gilbertson et al. | |
| 7,657,782 B2 | 2/2010 | Das et al. | |
| 7,664,879 B2 | 2/2010 | Chan et al. | |
| 7,693,999 B2 | 4/2010 | Park | |
| 7,702,947 B2 | 4/2010 | Peddada | |
| 7,716,274 B1 | 5/2010 | Kumar | |
| 7,765,256 B2 | 7/2010 | Doshi et al. | |
| 7,853,926 B2 | 12/2010 | Blouin et al. | |
| 7,882,173 B2 | 2/2011 | Hirsch et al. | |
| 7,953,883 B2 | 5/2011 | Thomas et al. | |
| 8,051,180 B2 | 11/2011 | Mazzaferri et al. | |
| 8,103,779 B2 | 1/2012 | Belkin et al. | |
| 2002/0111949 A1 | 8/2002 | Barga et al. | |
| 2002/0152430 A1 | 10/2002 | Akasaka et al. | |
| 2003/0079143 A1 * | 4/2003 | Mikel et al. | H04L 63/0428 |
| | | | 726/8 |
| 2003/0084165 A1 | 5/2003 | Kjellberg et al. | |
| 2003/0145103 A1 | 7/2003 | Pruyne et al. | |
| 2004/0044865 A1 | 3/2004 | Sicola et al. | |
| 2004/0249948 A1 * | 12/2004 | Sethi et al. | 709/227 |
| 2005/0240558 A1 | 10/2005 | Gil et al. | |
| 2006/0075112 A1 | 4/2006 | Polozoff | |
| 2006/0123098 A1 | 6/2006 | Asher et al. | |
| 2006/0242286 A1 | 10/2006 | Hawkins et al. | |
| 2007/0124187 A1 * | 5/2007 | Rajput | G06Q 10/06 |
| | | | 705/7.26 |
| 2007/0174493 A1 | 7/2007 | Irish et al. | |
| 2007/0208862 A1 | 9/2007 | Fox et al. | |
| 2008/0033964 A1 | 2/2008 | Richards et al. | |
| 2008/0062863 A1 | 3/2008 | Ginde | |
| 2008/0126831 A1 | 5/2008 | Downey et al. | |
| 2008/0134138 A1 | 6/2008 | Chamieh et al. | |
| 2008/0229023 A1 | 9/2008 | Plamondon | |
| 2008/0301418 A1 | 12/2008 | Khailany et al. | |
| 2009/0083088 A1 | 3/2009 | Mathew et al. | |
| 2009/0113457 A1 * | 4/2009 | Sedukhin et al. | 719/327 |
| 2010/0064130 A1 | 3/2010 | Borisov | |
| 2010/0153702 A1 | 6/2010 | Loveless | |
| 2010/0205583 A1 | 8/2010 | Gebhardt et al. | |
| 2010/0318570 A1 * | 12/2010 | Narasinghanallur et al. | |
| | | | 707/783 |
| 2011/0055839 A1 | 3/2011 | Alexander et al. | |
| 2011/0060622 A1 | 3/2011 | Piersol et al. | |
| 2011/0113247 A1 | 5/2011 | Panasyuk et al. | |
| 2011/0213821 A1 | 9/2011 | Gentile et al. | |
| 2012/0197925 A1 | 8/2012 | Balagopalan et al. | |
| 2013/0066949 A1 * | 3/2013 | Colrain | G06F 9/466 |
| | | | 709/203 |
| 2013/0339533 A1 | 12/2013 | Neerincx et al. | |
| 2014/0032491 A1 | 1/2014 | Neerincx et al. | |
| 2014/0032964 A1 | 1/2014 | Neerincx et al. | |
| 2014/0108868 A1 | 4/2014 | Neerincx et al. | |

FOREIGN PATENT DOCUMENTS

| | | |
|---|---|---|
| CN | 1963821 A | 5/2007 |
| CN | 101667195 A | 3/2010 |
| EP | 0554854 A2 | 8/1993 |

OTHER PUBLICATIONS

Sultan, et al., "Recovering Internet Service Sessions from Operating System Failures", In IEEE Internet Computing, vol. 9, Issue 2, Mar. 2005, pp. 17-27.

Balman, et al., "Early Error Detection and Classification in Data Transfer Scheduling", In International Conference on Intelligent and Software Intensive Systems, Mar. 16, 2009, pp. 457-462.

"Transparent Database Connection Reconnect", U.S. Appl. No. 13/086,959, filed Apr. 14, 2011, 35 Pages.

Barga, et al., "Measuring and Optimizing a System for Persistent Database Sessions", In 17th International Conference on Data Engineering, Apr. 6, 2001, pp. 21-30.

Non-Final Office Action Received in U.S. Appl. No. 13/527,384, dated Jan. 17, 2014, filed Jun. 19, 2012, 19 Pages.

"Oracle® Application Server Containers for J2EE Services Guide 10g Release 2 (10.1.2) for Windows or UNIX", Retrieved on: Dec. 22, 2011, Available at: http://docs.oracle.com/cd/B14099_19/web.1012/b14012/datasrc.htm, 23 Pages.

International Search Report & Written Opinion for PCT Patent Application No. PCT/US2013/052152, dated Oct. 9, 2013, Filed Date: Jul. 26, 2013, 9 Pages.

Non-final Office Action Issued in U.S. Appl. No. 13/560,468, dated Nov. 8, 2013, filed Jul. 27, 2012, 7 Pages.

Notice of Allowance Issued in U.S. Appl. No. 13/560,468, dated Mar. 6, 2014, filed Jul. 27, 2012, 8 Pages.

Barga, et al., "Persistent Client-Server Database Sessions", In Proceedings of the 7th International Conference on Extending Database Technology: Advances in Database Technology, Feb. 2000, 15 Pages.

Roehm, et al., "WebSphere Application Server V6 Scalability and Performance Handbook", In IBM Redbooks, May 26, 2005, 369 Pages.

International Search Report & Written Opinion for PCT Patent Application No. PCT/US2013/051751, dated Oct. 8, 2013, Filed Date: Jul. 24, 2013, 11 Pages.

Lomet, et al., "Efficient Transparent Application Recovery in Client-Server Information Systems", In Proceedings of the ACM SIGMOD International Conference on Management of Data, Jun. 1998, pp. 460-471.

"Virtual Session Management and Reestablishment", U.S. Appl. No. 13/527,384, filed Jun. 19, 2012, 44 Pages.

"Smart Error recovery for Database Applications", U.S. Appl. No. 13/653,318, filed Oct. 16, 2012, 36 Pages.

"Office Action Issued in European Patent Application No. 13747737.8", dated Aug. 24, 2018, 8 Pages.

"Office Action Issued in European Patent Application No. 13747737.8", dated Apr. 5, 2019, 8 Pages.

"First Office Action and Search Report Issued in Chinese Patent Application No. 201380040029.6", dated Mar. 13, 2017, 11 Pages.

\* cited by examiner

IDEMPOTENT COMMAND EXECUTION

BACKGROUND

A database server is a software product that provides database services to software applications in response to requests received therefrom. Such database services may include but are not limited to storing, retrieving, analyzing or manipulating database data. Depending upon the implementation, the software applications may be running on the same machine on which the database server is running or may be running on other machines that are connected to the machine on which the database server is running via one or more networks. To send requests to the database server, an application connects to the database server and establishes therewith what is referred to as a session. A session represents an ongoing interactive information exchange between the application and the database server. A session is set up or established at a certain point in time and then torn down at a later point in time. An established session often involves the sending of more than one message from the application to the database server and from the database server to the application.

After an application has initiated a session with a database server, it may send a command to the database server for execution within the context of the session. After the command has been sent, the session that was established between the application and the database server may be broken. For example, in a scenario in which the application and the database server are running on different machines, the session may be broken if the machine on which the database server is running is shut down or crashes or if there is a problem with a network that connects the different machines. When the session is broken, the application may not be able to determine whether the command that was sent to the database server was executed successfully, and thus whether it is safe to re-execute the command when a session is reestablished. That is to say, if the application sends the same command to the database server to ensure execution of the command, this may result in the command being executed more than once by the database server, which can cause data corruption.

One approach to addressing this issue is to program the application such that database operations are executed in a transactional manner. In accordance with such an approach, if the application is unable to determine whether a command that comprises part of a database transaction has been executed by the database server, the application can cause the database server to roll back the data managed thereby to a state that existed immediately prior to the execution of any of the commands in the transaction, at which point the transaction can be re-executed. However, such an approach requires the application to include complex logic for managing transactional execution of database operations. Furthermore, such an approach is inefficient in that it requires rollback and re-execution of all commands of a transaction whenever the application is unable to determine whether a command that comprises part of the transaction has been executed by the database server.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

Figure 1:
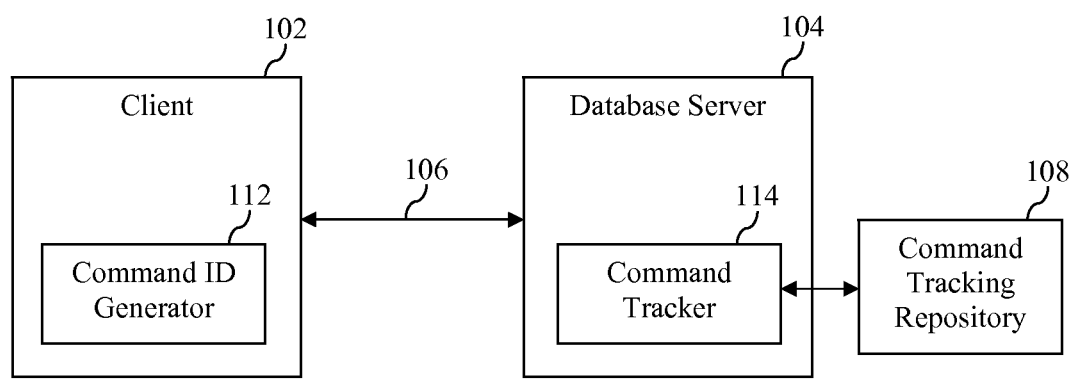
FIG. 1 is a block diagram of an example system that facilitates idempotent command execution in accordance with one embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of persons skilled in the relevant art(s) to implement such feature, structure, or characteristic in connection with other embodiments whether or not explicitly described.

Embodiments described herein facilitate idempotent execution of commands generated by a client for execution by a database server. As used herein, the term "idempotent command execution" refers to ensuring that a command generated by a client is executed no more than once by a database server, regardless of whether the command is sent to the database server multiple times. As noted in the Background Section above, if a database server executes the same command more than once, this can lead to corruption of data, and is thus to be avoided. Section II will describe example embodiments in which idempotent command execution is achieved via operations performed by a single database server instance. Section III will describe example embodiments in which idempotent command execution is achieved via operations performed by at least two instances of a database server. Section IV will describe an example processor-based computer system that may be used to implement various embodiments described herein. Finally, Section V will provide some concluding remarks.

Although the embodiments described herein are implemented in systems that include database servers, persons skilled in the relevant art(s) will readily appreciate that the concepts described herein can easily be extended to any system in which commands are transmitted from a first entity to a second entity for execution by the second entity and wherein repeat execution of the same command by the second entity is sought to be avoided. Such systems may include but are not limited to any of a wide variety of client-server systems, peer-to-peer systems, or the like.

II. Example Embodiments Involving a Single Database Server Instance

FIG. 1 is a block diagram of an example system 100 that facilitates idempotent command execution in accordance with one embodiment. System 100 is described herein by way of illustration only and is not intended to be limiting. Persons skilled in the relevant art(s) will appreciate that embodiments described herein may be implemented in systems other than system 100.

As shown in FIG. 1, system 100 includes a database server 104 and a client 102 that is communicatively connected thereto via a communication channel 106. Database server 104 is intended to represent an entity that performs operations with respect to data stored in one or more databases that are accessible thereto in response to receiving commands generated by clients, such as client 102, via communication channel 106. The operations performed by database server 104 may include, for example, storing, retrieving, analyzing and/or manipulating database data. Database server 104 may be implemented as software executing on a single machine or across multiple machines. As will be appreciated by persons skilled in the relevant art(s), such machines may comprise physical machines or virtual machines. In one embodiment, database server 104 comprises an instance of MICROSOFT SQL SERVER®, published by Microsoft Corporation of Redmond Wash. However, this is an example only and is not intended to be limiting.

In one embodiment, database server 104 comprises a standalone database server configured to execute commands received from one or more clients, such as client 102. In an alternate embodiment, database server 104 comprises one of a plurality of database server instances running on a cluster of machines and employed to service requests from a plurality of clients, such as client 102, in a manner that allows for failover and high availability. In a further embodiment, database server 104 comprises one of a plurality of database server instances used to implement a cloud database service, such as but not limited to MICROSOFT SQL AZURE™ offered by Microsoft Corporation of Redmond, Wash.

Client 102 is intended to represent an entity that generates and sends commands to database server 104 for execution thereby. Such commands may include, for example, commands to store, retrieve, analyze and/or manipulate database data. Like database server 104, client 102 may be implemented as software executing on one or more machines.

Client 102 and database server 104 may each be executed by different machines that are connected to each other via a particular communication infrastructure. In further accordance with such an implementation, communication channel 106 may be established in a manner that corresponds to the particular communication infrastructure. For example, in an embodiment in which the communication infrastructure comprises a network, such as a local area network (LAN) or wide area network (WAN), well-known networking protocols may be used to establish communication channel 106 between the two machines. As another example, in an embodiment in which database server 104 comprises part of a cloud database service, communication channel 106 may be established via a gateway machine that acts as an intermediary between the machine on which client 102 is running and the machine on which database server 104 is running. Still other communication infrastructures and associated methods for establishing communication channel 106 are possible.

It is also possible that client 102 and database server 104 may be executing on the same machine. In accordance with such an implementation, communication channel 106 may comprise a channel that is internal to the machine upon which both entities are executing.

Generally speaking, communication channel 106 is used to transport commands generated by client 102 to database server 104 so that database server 104 may execute such commands Database server 104 may also return requested data, error messages, or other information to client 102 via communication channel 106. In accordance with certain embodiments, the manner in which information is exchanged between client 102 and database server 104 is governed by a standard application layer protocol that is supported by both entities. For example, in a particular embodiment, the application layer protocol comprises the Tabular Data Stream (MS-TDS) protocol, as defined in Version 20120328 of the Tabular Data Stream Protocol Specification, published by Microsoft Corporation of Redmond, Wash. However, this is only an example, and other protocols may be used.

In accordance with certain embodiments, to interact with database server 104 for the purpose of invoking the database services thereof, client 102 connects to database server 104 and establishes therewith what is referred to herein as a session. A session represents an ongoing interactive information exchange between client 102 and database server 104. A session may be set up or established at a certain point in time and then torn down at a later point in time. During an established session, client 102 may send database server 104 any number of commands and database server 104 may return to client 102 results, error codes or other information in response to executing or attempting to execute such commands.

As further shown in FIG. 1, client 102 includes a command identifier (ID) generator 112. Command ID generator 112 comprises logic that is configured to generate an ID for each command that is generated by client 102 for transmission to and execution by database server 104. In one embodiment, command ID generator 112 generates a unique ID for each command so generated. When client 102 sends a command to database server 104, client 102 also sends the command ID associated with that command to database server 104. For example, in one embodiment, a command and its corresponding command ID are included within the same message that is transmitted from client 102 to database server 104.

As also shown in FIG. 1, database server 104 includes a command tracker 114. Command tracker 114 comprises logic that is configured to store the command ID associated with each command generated by client 102 and received by database server 104 in a command tracking repository 108 after database server 104 has executed or attempted to execute the command. Generally speaking, command tracking repository 108 comprises a storage device or system that can be accessed in some manner by or on behalf of database server 104. In one embodiment, command tracker 114 stores the command ID in command tracking repository 108 along with an indication of whether the command associated with the command ID was executed successfully by database server 104. In a further embodiment, command tracker 114 stores command IDs and execution information associated with received commands in command tracking repository 108 in association with a virtual session identifier (ID) that is associated with the particular session over which such commands were received.

The foregoing operations of command ID generator 112 and command tracker 114 enable command tracker 114 to perform additional operations that ensure that each command that is received by database server 104 from client 102 is executed no more than once by database server 104, regardless of whether the command is sent from client 102 to database server 104 multiple times. To achieve this, when a command is received by database server 104 from client 102, command tracker 114 operates to determine whether the command ID associated with the received command has already been stored in command tracking repository 108. In one embodiment, this comprises accessing command IDs stored in association with a particular virtual session ID in command tracking repository 108. If command tracker 114 determines that the command ID associated with the received command has not already been stored in command tracking repository 108, then this indicates that database server 104 has not yet attempted to execute the received command associated with the command ID, and command tracker 114 will allow database server 104 to try and execute the received command.

However, if command tracker 114 determines that the command ID associated with the received command has already been stored in command tracking repository 108 and that a previously-received command associated with the same command ID was executed successfully, then command tracker 114 will prevent database server 104 from executing the received command. If command tracker 114 determines that the command ID associated with the received command has already been stored in the command tracking repository but that execution of a previously-received command associated with the same command ID failed, command tracker 114 can be configured to either allow database server 104 to try and re-execute the command or to prevent database server 104 from further attempting to execute the command depending upon the particular configuration.

More information regarding the structure, function and operation of the components of system 100 in accordance with various implementations will now be provided in regard to FIGS. 2-5.

Figure 2:
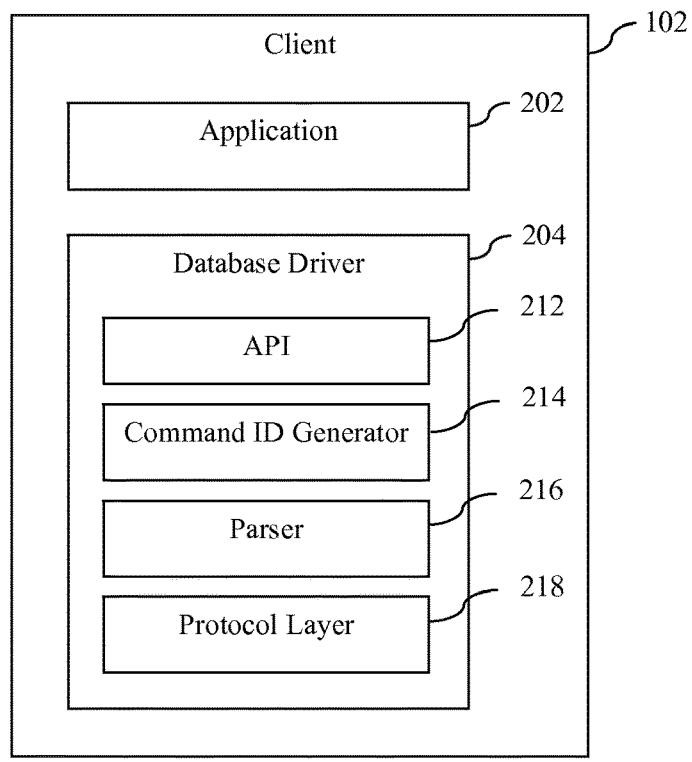
FIG. 2 is a block diagram that illustrates various elements of the client shown in FIG. 1 in accordance with one example embodiment.

In particular, FIG. 2 is a block diagram that illustrates various elements of client 102 in accordance with one example embodiment. As shown in FIG. 2, in the example embodiment, client 102 comprises an application 202 and a database driver 204. Application 202 comprises a software program that enables a user thereof to perform various functions, at least some of which require database operations to be performed. In order to facilitate the performance of such database operations, application 202 is programmed to interact with database driver 204. Database driver 204 comprises a software component that operates to establish a connection between application 202 or any of a variety of other applications and a database server and to utilize such connection for the purpose of obtaining services from the database server.

In one embodiment, database driver 204 provides an application programming interface (API) 212 that can be used by any of a variety of applications to invoke the functionality thereof. As further shown in FIG. 2, database driver 204 also includes a command ID generator 214, a parser 216, and a protocol layer 218. Command ID generator 214 is intended to represent one implementation of command ID generator 112 described above in reference to system 100 of FIG. 1 and thus performs the functions previously attributed to that component. Parser 216 is a software component that is configured to encode commands to be sent to a database server and to interpret information received therefrom in accordance with a particular application layer protocol, such as but not limited to MS-TDS. Protocol layer 218 is intended to represent one or more software component(s) utilized by database driver 204 to carry encoded commands produced by parser 216 to a database server and to receive encoded information therefrom.

In accordance with the embodiment shown in FIG. 2, the functions performed by command ID generator 214 in relation to idempotent command execution are performed at the level of database driver 204 rather than at the level of application 202. This is advantageous in that it can relieve programmers of applications that are designed to invoke database driver 204, such as application 202, from having to program features into their applications that are intended to prevent a database server from executing the same command more than once. Additionally, by incorporating such functionality at the database driver level rather than the application level, embodiments described herein can advantageously reduce the complexity of such applications.

Figure 3:
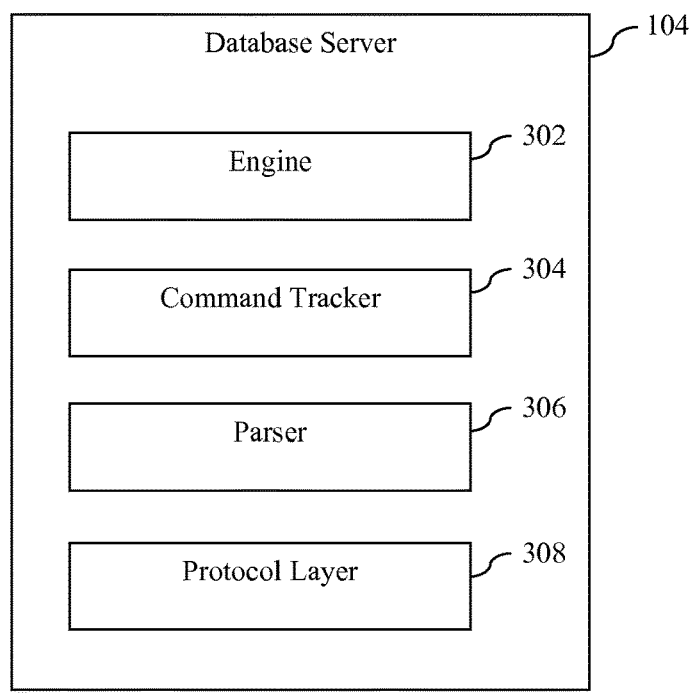
FIG. 3 is a block diagram that illustrates various elements of the database server shown in FIG. 1 in accordance with one example embodiment.

FIG. 3 is a block diagram that illustrates various elements of database server 104 in accordance with a further example embodiment. As shown in FIG. 3, in the further example embodiment, database server 104 comprises an engine 302, a command tracker 304, a parser 306 and a protocol layer 308. Engine 302 comprises a software component that is configured to interact with one or more databases to perform various operations on data stored therein, where such operations include but are not limited to storing, retrieving, analyzing and/or manipulating database data. Command tracker 304 is intended to represent one implementation of command tracker 114 as described above in reference to system 100 of FIG. 1 and thus performs the functions previously attributed to that component. Parser 306 is a software component that is configured to interpret client-generated commands that are received by database server 104 and to encode information to be sent to clients in accordance with a particular application layer protocol, such as but not limited to MS-TDS. Protocol layer 308 is intended to represent one or more software component(s) utilized by database server 104 to carry encoded information produced by parser 306 to the appropriate clients and to receive encoded commands therefrom.

Figure 4:
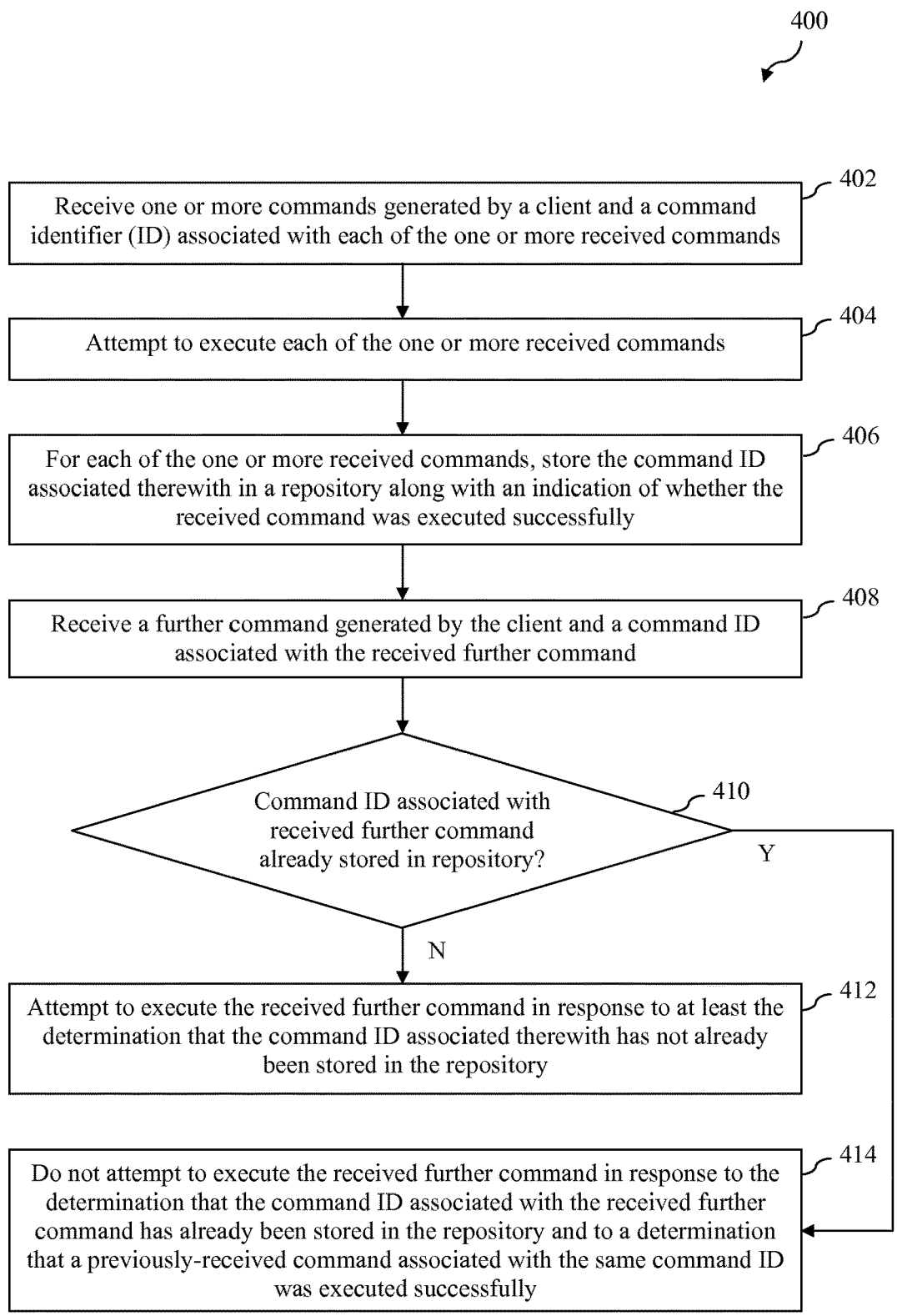
FIG. 4 depicts a flowchart of a method for ensuring idempotent command execution by a database server in accordance with an embodiment.

FIG. 4 depicts a flowchart 400 of a method for ensuring idempotent command execution by a database server in accordance with an embodiment. The method of flowchart 400 is directed to an embodiment in which idempotent command execution is achieved via operations performed by a single database server instance. For the sake of illustration, the steps of flowchart 400 will now be described with continued reference to example embodiments described above in reference to FIGS. 1-3. However, the method of flowchart 400 is not limited to those embodiments.

As shown in FIG. 4, the method of flowchart 400 begins at step 402 in which one or more commands generated by client 102 are received by database server 104. In further accordance with step 402, database server 104 also receives a command ID associated with each of the one or more received commands. As discussed above, such command IDs may be generated by command ID generator 112 or command ID generator 214 within client 102 and transmitted to database server 104 along with their associated commands. With reference to the implementation of client 102 shown in FIG. 2, such commands may be encoded by parser 216 and sent to database server 104 via protocol layer 218. With reference to the implementation of database server 104 shown in FIG. 3, the encoded commands may be received via protocol layer 308 and interpreted by parser 306.

In one embodiment, prior to step 402 being performed, a first session is established between client 102 and database server 104. In accordance with such an embodiment, the one or more commands received by database server 104 during step 402 are received within the context of the first session.

At step 404, database server 104 attempts to execute each of the commands that were received by database server 104 during step 402. With reference to the implementation of database server 104 shown in FIG. 3, this step may be performed by engine 302.

At step 406, for each of the one or more commands that were received by database server 104, the command ID associated therewith is stored in command tracking repository 108 along with an indication of whether the received command was executed successfully. As discussed above, this step may be performed by command tracker 114 or command tracker 304 within database server 104. In one embodiment, results of the successful execution of a received command are not committed by database server 104 until after the command ID associated with the received command and an indication of the successful execution thereof has been stored in command tracking repository 108.

In an embodiment in which the one or more commands received by database server 104 during step 402 are received within the context of a first session, storing the command ID associated each received command in command tracking repository 108 may include storing the command ID associated with each received command in command tracking repository 108 in association with an identifier of a virtual session with which the first session is associated. In further accordance with such an embodiment, the virtual session ID may comprise a portion of the command ID.

In one embodiment, subsequent to the performance of step 406 but prior to step 408 being performed, a first session that was established between client 102 and database server 104 is broken and a new, second session is established between client 102 and database server 104. The breaking of the first session may occur, for example, due to a problem with a network that operates to connect client 102 and database server 104 or for some other reason. In further accordance with such an embodiment, the first session and the second session may each be associated with the same virtual session ID.

At step 408, a further command that is generated by client 102 is received by database server 104. In further accordance with step 408, database server 104 also receives a command ID associated with the received further command. As discussed above, such command ID may also be generated by command ID generator 112 or command ID generator within client 102 and transmitted to database server 104 along with its associated command. With reference to the implementation of client 102 shown in FIG. 2, such further command may be encoded by parser 216 and sent to database server 104 via protocol layer 218. With reference to the implementation of database server 104 shown in FIG. 3, the encoded further command may be received via protocol layer 308 and interpreted by parser 306.

In the embodiment in which a second session is established between client 102 and database server 104 prior to step 408, the further command received by database server 104 during step 408 is received within the context of the second session.

At decision step 410, it is determined whether the command ID associated with the further command received by database server 104 during step 408 has already been stored in command tracking repository 108. As discussed above, this determination may be made by command tracker 114 or command tracker 304 within database server 104.

In an embodiment in which the further command is received by database server 104 within the context of a second session established after a first session was broken and in which the first and second session are each associated with the same virtual session ID, decision step 410 may be performed by accessing command IDs stored in command tracking repository 108 in association with the relevant virtual session ID. As previously noted, in certain embodiments, the virtual session ID may comprise a portion of the command IDs.

If it is determined during decision step 410 that the command ID associated with the received further command has not already been stored in command tracking repository 108, then control flows to step 412. During step 412, database server 104 attempts to execute the further command received during step 408 in response to at least the determination that the command ID associated therewith has not already been stored in command tracking repository 108. With reference to the implementation of database server 104 shown in FIG. 3, such attempted execution may be carried out by engine 302.

However, if it is determined during decision step 410 that the command ID associated with the received further command has already been stored in command tracking repository 108, then control flows to step 414. During step 414, database server 104 does not attempt to execute the received further command in response to the determination that the command ID associated with the received further command has already been stored in command tracking repository 108 and further in response to a determination that a previously-received command associated with the same command ID was executed successfully. By so doing, database server 104 avoids executing the same command more than once.

In a further embodiment, in response to the determination that the command ID associated with the received further command has already been stored in command tracking repository 108 and the determination that the previously-received command associated with the same command ID was executed successfully, database server 104 returns a message to client 102 indicating that the previously-received command was executed successfully and/or cached results that were generated during execution of the previously-received command. By caching and returning the previously-generated results in this manner, an embodiment can avoid having to re-execute a command to return the desired results.

It is possible that a determination will be made that the command ID associated with the received further command has already been stored in command tracking repository 108 but that a previously-received command associated with the same command ID was not executed successfully. In this case, database server 104 may either attempt to re-execute the command or may prohibit re-execution of the command depending on the manner in which it is configured.

Figure 5:
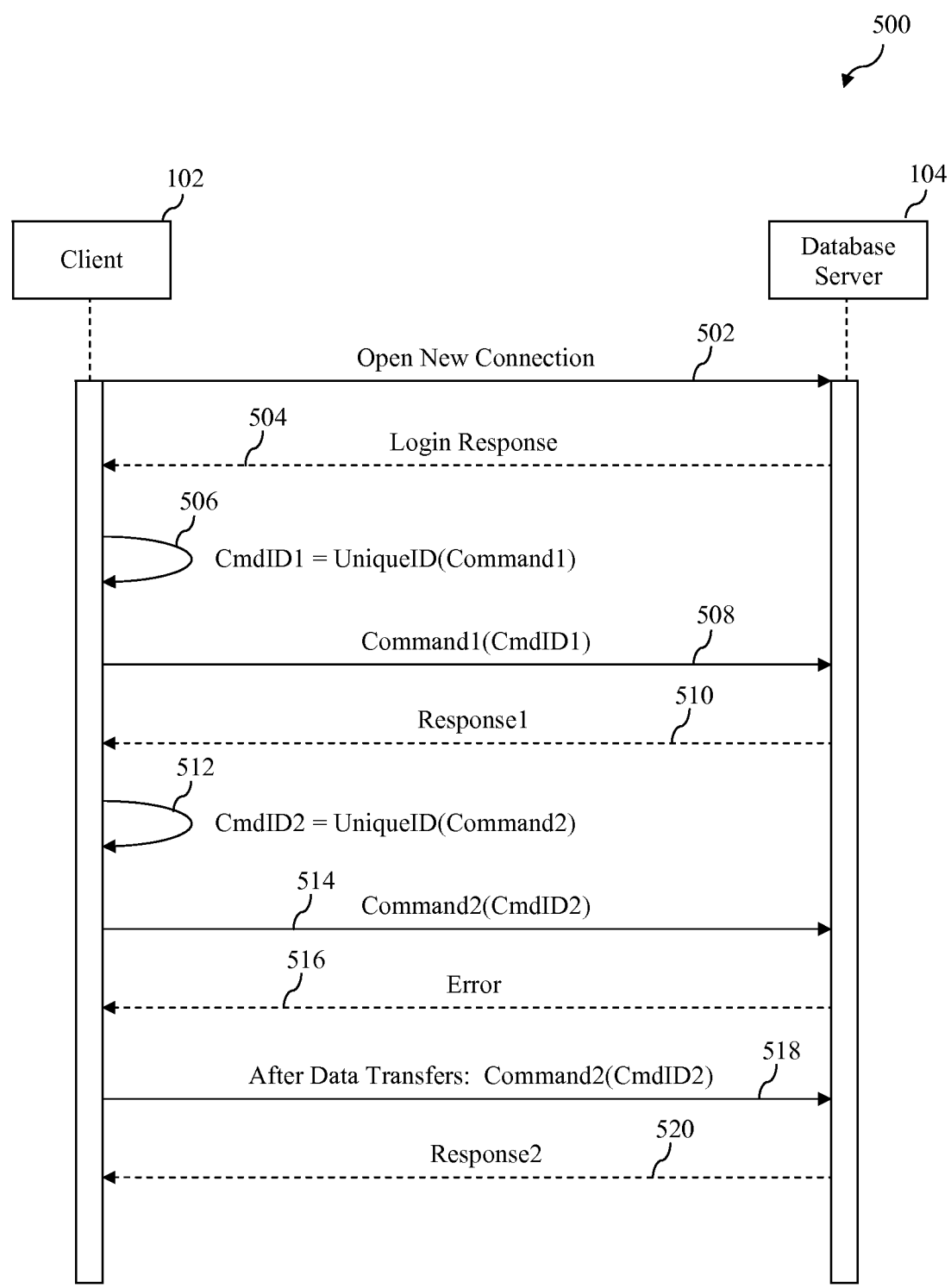
FIG. 5 is a sequence diagram that illustrates a flow of information between a client and a database server in a system that ensures idempotent command execution in accordance with an embodiment.

FIG. 5 is a sequence diagram 500 that illustrates an example flow of information between client 102 and database server 104 in accordance with an embodiment. Sequence diagram 500 is described herein merely to facilitate a further understanding of the manner in which system 100 may facilitate idempotent command execution and is not intended to be limiting.

As shown in FIG. 5, the flow of information depicted by sequence diagram 500 begins when client 102 sends a request 502 to database server 104 to open a new connection. In response to receiving request 502, database server 104 sends a login response 504 to client 102, thereby establishing the requested connection.

Subsequent to the establishment of the connection, client 102 generates a command, referred to as "Command1," for transmission to database server 104. Client 102 then applies a method referred to as "UniqueID" to Command1 to obtain a unique ID associated therewith, referred to as "CmdID1." This is shown as event 506 in FIG. 5.

After client 102 has obtained the unique identifier CmdID1 associated with Command1, client 102 sends both Command1 and its associated unique ID CmdID1 to database server 104 as part of a message 508.

Database server 104 receives Command1 and executes it successfully, returning a response 510, referred to as "Response1," to client 102. Response1 may include various results and/or other information relating to the execution of Command1 by database server 104. After database server 104 has successfully executed Command1, it also stores the unique ID CmdID1 in a repository that is accessible thereto along with an indication that Command1 has executed successfully. Database server 104 may store the unique ID CmdID1 in association with an identifier of the session that has been established between client 102 and database server 104. In certain embodiments, such session may comprise a virtual session.

Subsequent to receiving response 510, client 102 generates another command, referred to as "Command2," for transmission to database server 104. Client 102 then applies the UniqueID method to Command2 to obtain a unique ID associated therewith, referred to as "CmdID2." This is shown as event 512 in FIG. 5.

After client 102 has obtained the unique identifier CmdID2 associated with Command2, client 102 sends both Command2 and its associated unique ID CmdID2 to database server 104 as part of a message 514.

After message 514 is sent, client 102 receives an indication 516 that an error has occurred. Such error may result from some failure of communication between client 102 and database server 104 or from a breaking of the session that was established between client 102 and database server 104.

Because such error has occurred, client 102 cannot determine whether Command2 was successfully executed by database server 104. Consequently, client 102 re-transmits Command2 along with its unique ID CmdID2 to database server 104 as part of a message 518. In one embodiment, client 102 is capable of retransmitting Command2 to database server 104 because the session that was established between the two entities was not broken as a result of the error. In another embodiment, client 102 is capable of retransmitting Command2 to database server 104 because it re-established a new session therewith that is part of a same virtual session as the previously-broken session.

When database server 104 receives Command2 and its unique ID CmdID2, it checks the repository to see if CmdID2 has already been stored therein. This may entail checking all command IDs associated with the session over which message 518 was received. In some embodiments such session may comprise a virtual session. If CmdID2 has already been stored in the repository along with an indication that Command2 completed successfully, database server 104 will not re-execute Command2. Database server 104 may, however, send a response 520 (shown as "Response2") to client 102 that includes an indication that Command2 was executed successfully and/or cached results that were generated when Command2 was previously executed.

If CmdID2 has not already been stored in the repository, then database server 104 will try to execute the command. If Command2 is executed successfully, then database server 104 will return response 520 to client 102, wherein response 520 may include various results and/or other information relating to the successful execution of Command2 by database server 104.

As shown by the foregoing, system 100 advantageously operates to ensure that database server 104 will not execute a command received from client 102 more than once, even if client 102 sends the same command multiple times. This enables client 102 to re-transmit a command to database server 104 when it is unable to determine if database server 104 has received and/or executed such command without risk of data corruption. Furthermore, in certain embodiments, the generation of unique command IDs and the re-transmission of commands can all be handled at the database driver level, thereby unburdening the application programmer from having to include such features in the application and thus simplifying the application logic.

III. Example Embodiments Involving Multiple Database Server Instances

Figure 6:
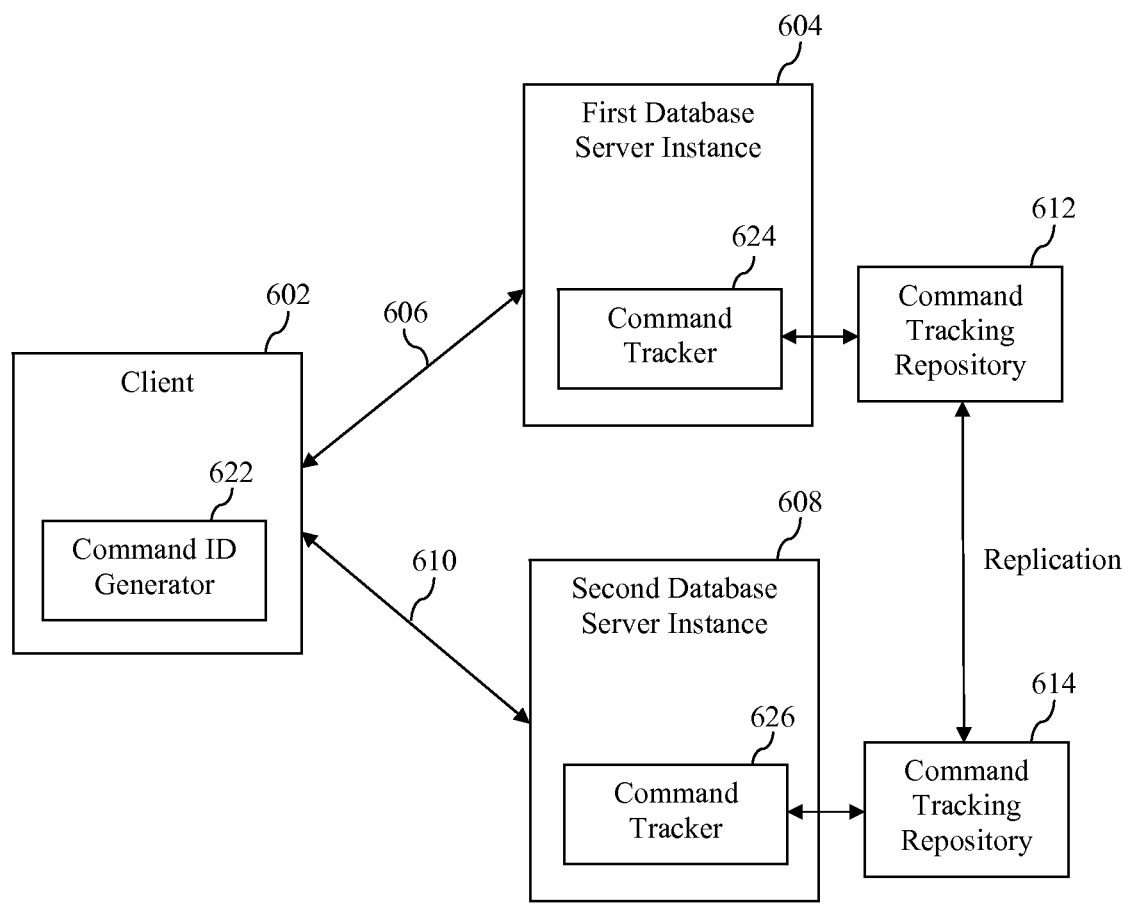
FIG. 6 is a block diagram of an example system that facilitates idempotent command execution in accordance with an alternate embodiment in which command-related information is shared between a first database server instance and a second database server instance using replication.

FIG. 6 is a block diagram of an example system 600 that facilitates idempotent command execution in accordance with an alternate embodiment. System 600 is described herein by way of illustration only and is not intended to be limiting. Persons skilled in the relevant art(s) will appreciate that embodiments described herein may be implemented in systems other than system 600.

As shown in FIG. 6, system 600 includes a first database server instance 604, a second database server instance 608, and a client 602. First database server instance 604 and second database server instance 608 are each intended to represent an entity that performs operations with respect to data stored in one or more databases that are accessible thereto in response to receiving commands generated by clients, such as client 602, via a communication channel. The operations performed by first database server instance 604 and second database server instance 608 may include, for example, storing, retrieving, analyzing and/or manipulating database data. Each of first database server instance 604 and second database server instance 608 may be implemented as software executing on a single machine or across multiple machines. As will be appreciated by persons skilled in the relevant art(s), such machines may comprise physical machines or virtual machines. In one embodiment, first database server instance 604 and second database server instance 608 each comprise an instance of MICROSOFT SQL SERVER®, published by Microsoft Corporation of Redmond Wash. However, this is an example only and is not intended to be limiting.

In one embodiment, first database server instance 604 and second database server instance 608 comprise database server instances running on a cluster of machines and employed to service requests from a plurality of clients, such as client 602, in a manner that allows for failover and high availability. In a further embodiment, first database server instance 604 and second database server instance 608 comprise database server instances used to implement a cloud database service, such as but not limited to MICROSOFT SQL AZURE™, offered by Microsoft Corporation of Redmond, Wash.

Client 602 is intended to represent an entity that generates and sends commands to first database server instance 604 via a first communication channel 606 for execution thereby within the context of a first session and, when the first session is broken, generates and sends commands to second database server instance 608 via a second communication channel 610 for execution thereby within the context of a second session, wherein the first session and the second session are each associated with the same virtual session. The commands generated and sent by client 602 may include, for example, commands to store, retrieve, analyze and/or manipulate database data. Like each of first database server instance 604 and second database server instance 608, client 602 may be implemented as software executing on one or more machines.

Client 602 may be executed on a machine that is separate from the machine(s) on which and first database server instance 604 and second database server instance 608 are running and may be connected thereto via a particular communication infrastructure. In further accordance with such an implementation, each of first communication channel 606 and second communication channel 610 may be established in a manner that corresponds to the particular communication infrastructure. For example, in an embodiment in which the communication infrastructure comprises a network, such as a LAN or WAN, well-known networking protocols may be used to establish each of first communication channel 606 and second communication channel 610. As another example, in an embodiment in which first database server instance 604 and second database server instance 608 comprise part of the same cloud database service, each of first communication channel 606 and second communication channel 610 may be established via a gateway machine that acts as an intermediary between the machine on which client 602 is running and the machine(s) on which first database server instance 604 and second database server instance 608 are running Still other communication infrastructures and associated methods for establishing first communication channel 606 and second communication channel 610 are possible.

It is also possible that client 602 may be executing on the same machine as first database server instance 604 and/or second database server instance 608. In accordance with such an implementation, first communication channel 606 and/or second communication channel 610 may comprise a channel that is internal to a machine upon which client 602 and the database server instance(s) are executing.

Generally speaking, each of first communication channel 606 and second communication channel 610 is used to transport commands generated by client 602 to a corresponding one of first database server instance 604 and second database server instance 608 for execution thereby. Each of first database server instance 604 and second database server instance 608 may also return requested data, error messages, or other information to client 602 via a corresponding one of first communication channel 606 and second communication channel 610. In accordance with certain embodiments, the manner in which information is exchanged between client 602 and each of first database server instance 604 and second database server instance 608 is governed by a standard application layer protocol that is supported by those entities. For example, in a particular embodiment, the application layer protocol comprises the Tabular Data Stream (MS-TDS) protocol, as defined in Version 20120328 of the Tabular Data Stream Protocol Specification, published by Microsoft Corporation of Redmond, Wash. However, this is only an example, and other protocols may be used.

To interact with first database server instance 604 for the purpose of invoking the database services thereof, client 602 connects to first database server instance 604 and establishes therewith a first session. When the first session breaks, client 102 connects to second database server instance 608 and establishes therewith a second session, wherein the first session and the second session are each associated with the same virtual session. The breaking of the first session may occur for a variety of reasons, such as but not limited to the shutting down or crashing of a machine on which first database server instance 604 is running or a problem with communication channel 606 that connects client 602 to first database server instance 604.

As further shown in FIG. 1, client 602 includes a command ID generator 622. Command ID generator 622 comprises logic that is configured to generate an ID for each command that is generated by client 602 for transmission to and execution by each of first database server instance 604 and second database server instance 608. In one embodiment, command ID generator 622 generates a unique ID for each command so generated. When client 622 sends a command to first database server instance 604 or second database server instance 608, client 602 also sends the command ID associated with that command. For example, in one embodiment, a command and its corresponding command ID are included within the same message that is transmitted from client 602 to first database server instance 604 or second database server instance 608.

As also shown in FIG. 6, first database server instance 604 includes a first command tracker 624. First command tracker 624 comprises logic that is configured to store the command ID associated with each command generated by client 602 and received by first database server instance 604 in a first command tracking repository 612 after first database server instance 604 has executed or attempted to execute the command. Generally speaking, first command tracking repository 612 comprises a storage device or system that can be accessed in some manner by or on behalf of first database server instance 604. In one embodiment, first command tracker 624 stores the command ID in first command tracking repository 612 along with an indication of whether the command associated with the command ID was executed successfully by first database server instance 604. In a further embodiment, first command tracker 624 stores command IDs and execution information associated with received commands in first command tracking repository 612 in association with a virtual session identifier (ID) that is associated with the first session over which such commands were received.

Second database server instance 604 includes a second command tracker 626 that operates in a like manner to first command tracker 624. In particular, second command tracker 626 comprises logic that is configured to store the command ID associated with each command generated by client 602 and received by second database server instance 608 in a second command tracking repository 614 after second database server instance 608 has executed or attempted to execute the command. Generally speaking, second command tracking repository 614 comprises a storage device or system that can be accessed in some manner by or on behalf of second database server instance 608. In one embodiment, second command tracker 626 stores the command ID in second command tracking repository 614 along with an indication of whether the command associated with the command ID was executed successfully by second database server instance 608. In a further embodiment, second command tracker 626 stores command IDs and execution information associated with received commands in second command tracking repository 614 in association with a virtual session identifier (ID) that is associated with the second session over which such commands were received.

In the system shown in FIG. 6, the command IDs and associated information stored by first command tracker 624 in first command tracking repository 612 are replicated to second command tracking repository 614. Accordingly, when client 602 establishes the second session with second database server instance 608 after the first session with first database server instance 604 breaks, second database server instance 608 will have access to the same command-related information that first database server instance 612 did prior to the break. Such replication may be carried out by a process running on the same machine(s) upon which first database server instance 604 or second database server instance 608 are running or by a process running upon a different machine entirely.

As noted above, when the first session between client 602 and first database server instance 604 breaks, client 602 establishes a second session with second database server instance 608, wherein the first and second session are associated with the same virtual session ID. Due to the session break, client 602 may be unable to determine whether a command that was sent to first database server instance 604 before the break was executed. Therefore, client 602 may send the same command to second database server instance 608 after the second session is established to ensure that such command is executed. As will be discussed herein, second command tracker 626 will perform operations to ensure that the retransmitted command is executed no more than once by first and second database server instances 604 and 608.

To achieve this, when a command is received by second database server instance 608 from client 602, second command tracker 626 operates to determine whether the command ID associated with the received command has already been stored in second command tracking repository 614, which includes a replicated copy of the data stored in first command tracking repository 612 as discussed above. In one embodiment, this comprises accessing command IDs stored in association with a particular virtual session ID in second command tracking repository 614. If second command tracker 626 determines that the command ID associated with the received command has not already been stored in second command tracking repository 614, then this indicates that both first database server instance 604 and second database server instance 608 have not yet attempted to execute the received command associated with the command ID, and second command tracker 626 will allow second database server instance 608 to try and execute the received command.

However, if second command tracker 626 determines that the command ID associated with the received command has already been stored in second command tracking repository 614 and that a previously-received command associated with the same command ID was executed successfully, then second command tracker 626 will prevent second database server instance 608 from executing the received command. If second command tracker 626 determines that the command ID associated with the received command has already been stored in second command tracking repository 614 but that execution of a previously-received command associated with the same command ID failed, second command tracker 626 can be configured to either allow second database server instance 608 to try and re-execute the command or to prevent second database server instance 608 from further attempting to execute the command depending upon the particular configuration.

Client 602 may be implemented in a like manner to the embodiment of client 102 shown in FIG. 2, such that command ID generator 622 comprises part of a database driver. Furthermore, each of first database server instance 604 and second database server instance 608 may be implemented in a like manner to the embodiment of database server 104 shown in FIG. 3.

Figure 7:
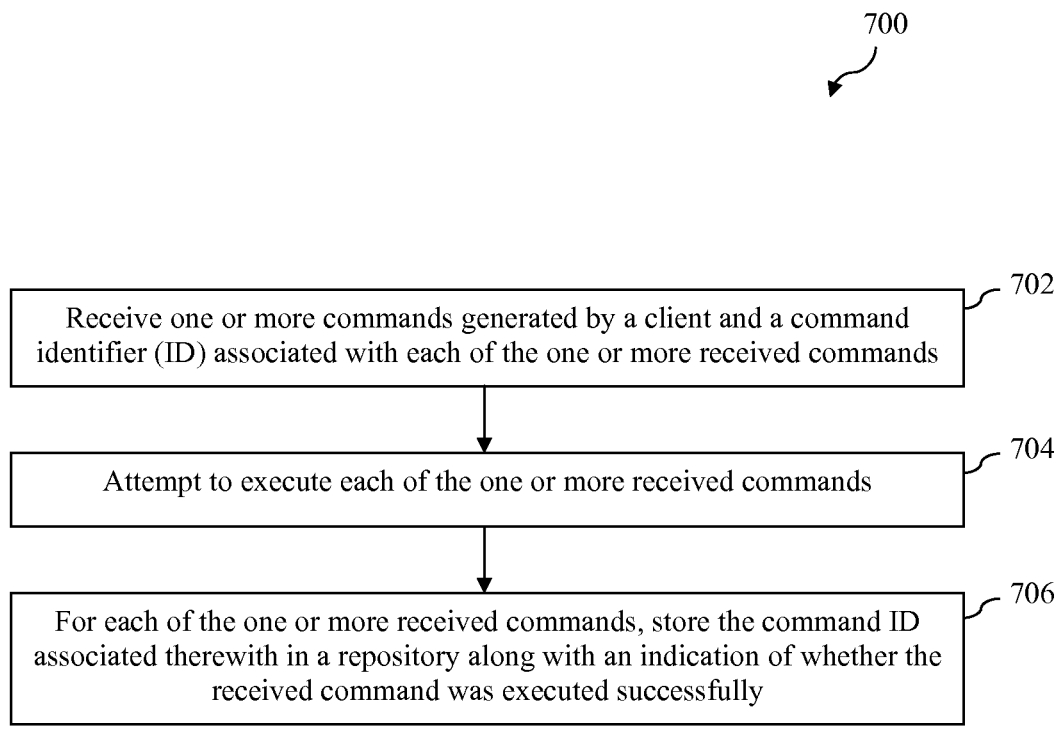
FIGS. 7 and 8 depict flowcharts that collectively illustrate a method for ensuring idempotent command execution by a plurality of database server instances in accordance with an embodiment.
Figure 8:
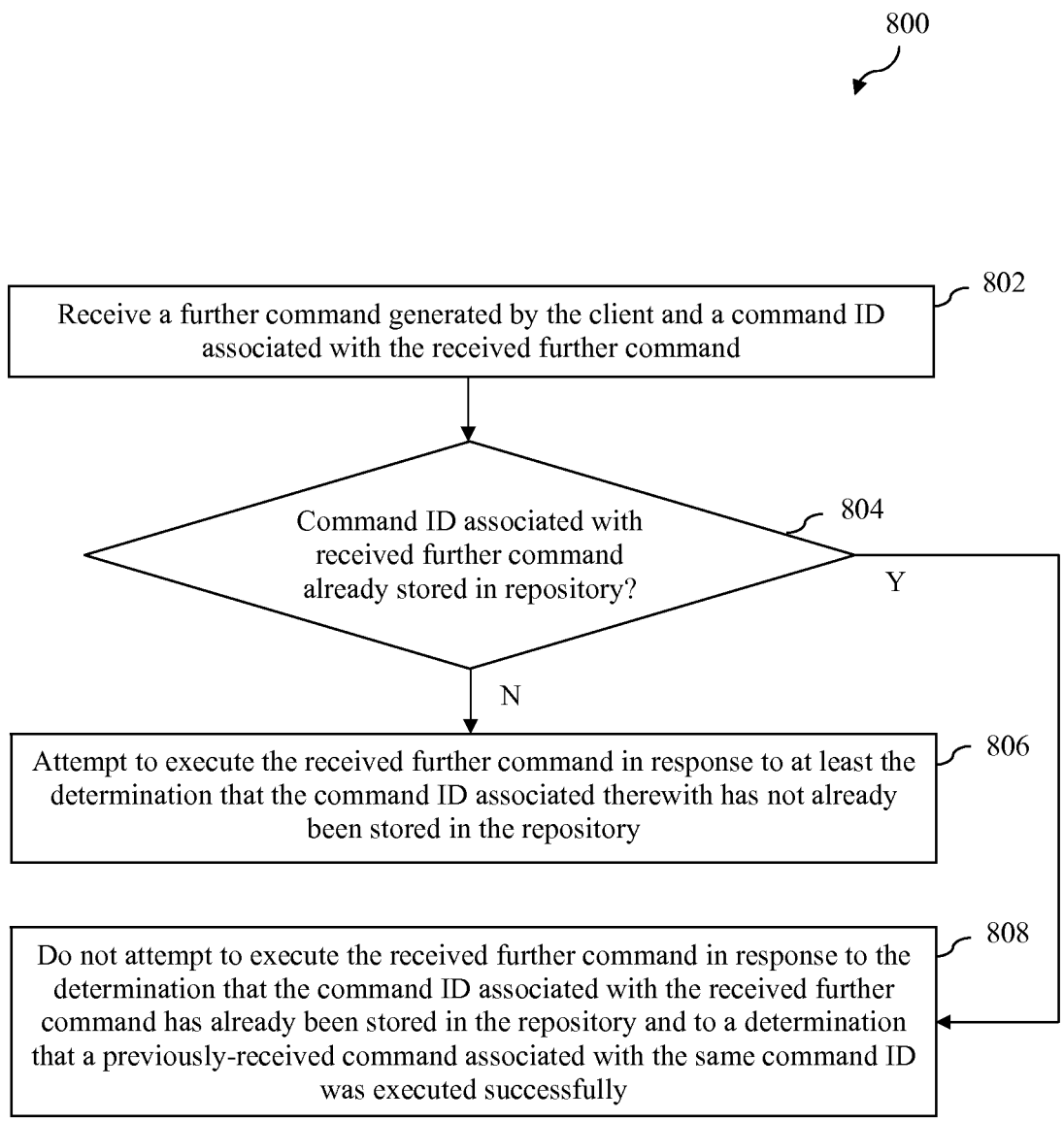

FIGS. 7 and 8 depict flowcharts 700 and 800, respectively, which collectively illustrate a method for ensuring idempotent command execution by a plurality of database server instances in accordance with an embodiment. The method illustrated by flowcharts 700 and 800 are directed to an embodiment in which idempotent command execution is achieved via operations performed by multiple database server instances. For the sake of illustration, the steps of flowcharts 700 and 800 will now be described with continued reference to the example embodiment described above in reference to FIG. 6. However, the methods of flowchart 700 and 800 are not limited to that embodiment.

The method of flowchart 700 will now be described. Each of the steps of this method may be performed by first database server instance 604. As shown in FIG. 7, the method of flowchart 700 begins at step 702 in which one or more commands generated by client 602 are received by first database server instance 604. In further accordance with step

702, first database server instance 604 also receives a command ID associated with each of the one or more received commands. As discussed above, such command IDs may be generated by command ID generator 622 within client 602 and transmitted to first database server instance 604 along with their associated commands.

In one embodiment, prior to step 702 being performed, a first session is established between client 602 and first database server instance 604. In accordance with such an embodiment, the one or more commands received by first database server instance 604 during step 702 are received within the context of the first session.

At step 704, first database server instance 604 attempts to execute each of the commands that were received by first database server instance 604 during step 702.

At step 706, for each of the one or more commands that were received by first database server instance 604, the command ID associated therewith is stored in first command tracking repository 612 along with an indication of whether the received command was executed successfully. As discussed above, this step may be performed by first command tracker 624 within first database server instance 604. In one embodiment, results of the successful execution of a received command are not committed by first database server instance 604 until after the command ID associated with the received command and an indication of the successful execution thereof has been stored in first command tracking repository 612.

In an embodiment in which the one or more commands received by first database server instance 604 during step 702 are received within the context of a first session, storing the command ID associated each received command in first command tracking repository 612 may include storing the command ID associated with each received command in first command tracking repository 612 in association with an identifier of a virtual session with which the first session is associated. In further accordance with such an embodiment, the virtual session ID may comprise a portion of the command ID.

The method of flowchart 800 will now be described. Each of the steps of this method may be performed by second database server instance 608. In one embodiment, subsequent to the performance of the method of flowchart 700 by first database server instance 604 but prior to the performance of the method of flowchart 800 by second database server instance 608, a first session that was established between client 602 and first database server instance 604 is broken and a new, second session is established between client 602 and second database server instance 608. The breaking of the first session may occur, for example, due to an intentional or unintentional shut down of a machine upon which first database server instance 604 is executing, a problem with a network that operates to connect client 602 and first database server instance 604, or for some other reason. In further accordance with such an embodiment, the first session and the second session may each be associated with the same virtual session ID.

The method of flowchart 800 begins at step 802, in which a further command that is generated by client 602 is received by second database server instance 608. In further accordance with step 802, second database server instance 608 also receives a command ID associated with the received further command. As discussed above, such command ID may also be generated by command ID generator 622 within client 602 and transmitted to second database server instance 608 along with its associated command.

In the embodiment in which a second session is established between client 602 and second database server instance 608 prior to the performance of the method of flowchart 800, the further command received by second database server instance 608 during step 802 is received within the context of the second session.

At decision step 804, it is determined whether the command ID associated with the further command received by second database server instance 608 during step 802 has already been stored in second command tracking repository 614, which, as discussed above, includes a replicated copy of the information that was stored in first command tracking repository 612. The determination made during decision step 804 may be made by second command tracker 626 within second database server instance 608.

In an embodiment in which the further command is received by second database server instance 608 within the context of a second session established after a first session was broken and in which the first and second session are each associated with the same virtual session ID, decision step 804 may be performed by accessing command IDs stored in second command tracking repository 614 in association with the relevant virtual session ID. As previously noted, in certain embodiments, the virtual session ID may comprise a portion of the command IDs.

If it is determined during decision step 804 that the command ID associated with the received further command has not already been stored in second command tracking repository 614, then control flows to step 806. During step 806, second database server instance 608 attempts to execute the further command received during step 802 in response to at least the determination that the command ID associated therewith has not already been stored in second command tracking repository 614.

However, if it is determined during decision step 804 that the command ID associated with the received further command has already been stored in second command tracking repository 614, then control flows to step 808. During step 808, second database server instance 608 does not attempt to execute the received further command in response to the determination that the command ID associated with the received further command has already been stored in second command tracking repository 614 and further in response to a determination that a previously-received command associated with the same command ID was executed successfully. By so doing, second database server instance 608 avoids executing the same command more than once.

In a further embodiment, in response to the determination that the command ID associated with the received further command has already been stored in second command tracking repository 614 and the determination that the previously-received command associated with the same command ID was executed successfully, second database server instance 608 returns a message to client 602 indicating that the previously-received command was executed successfully and/or cached results that were generated during execution of the previously-received command. By caching and returning the previously-generated results in this manner, an embodiment can avoid having to re-execute a command to return the desired results.

It is possible that a determination will be made that the command ID associated with the received further command has already been stored in second command tracking repository 614 but that a previously-received command associated with the same command ID was not executed successfully. In this case, second database server instance 608 may either attempt to re-execute the command or may prohibit re-execution of the command depending on the manner in which it is configured.

In system 600 of FIG. 6, replication is used to ensure that first command tracker 624 and second command tracker 626 each have access to a repository that includes the same command-related information (e.g., command IDs and execution information). However, other approaches may be used to achieve this goal.

Figure 9:
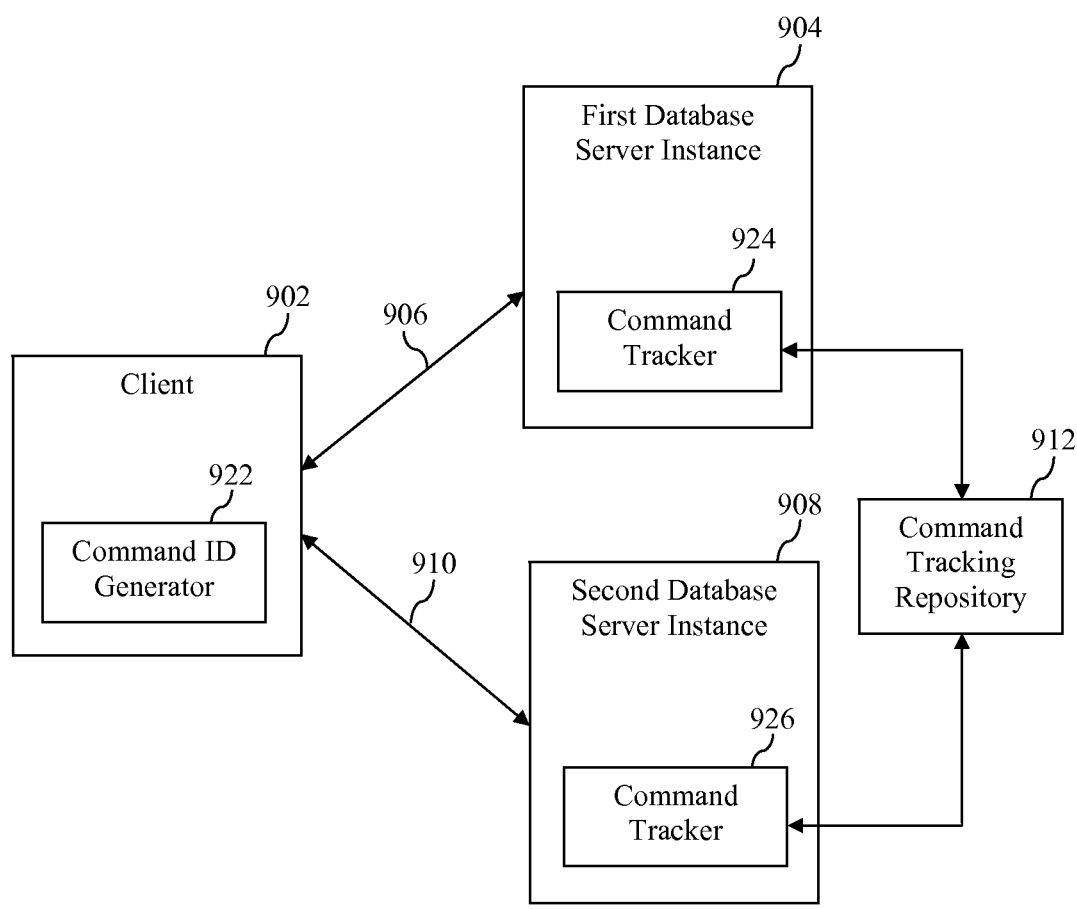
FIG. 9 is a block diagram of an example system that facilitates idempotent command execution in accordance with an alternate embodiment in which command-related information is shared between a first database server instance and a second database server instance via use of a shared memory.

For example, FIG. 9 is a block diagram of an example system 900 that utilizes a shared memory approach to achieve the goal. In system 900, client 902, command ID generator 922, first database server instance 904, first command tracker 924, second database server instance 908 and second command tracker 926 operate in a substantially similar manner to like-named elements of system 600. However, in system 900, rather than using replication to ensure that second command tracker 926 has access to command-related information previously stored by first command tracker 924, a shared command tracking repository 912 is used. In accordance with this approach, first command tracker 924 and second command tracker 926 are both able to access the same command tracking repository 912 and are both configured to store command tracking data (e.g., command IDs and execution information associated with commands) thereto. Consequently, command-related information stored in command tracking repository 912 by first command tracker 924 will subsequently be accessible to second command tracker 926.

Figure 10:
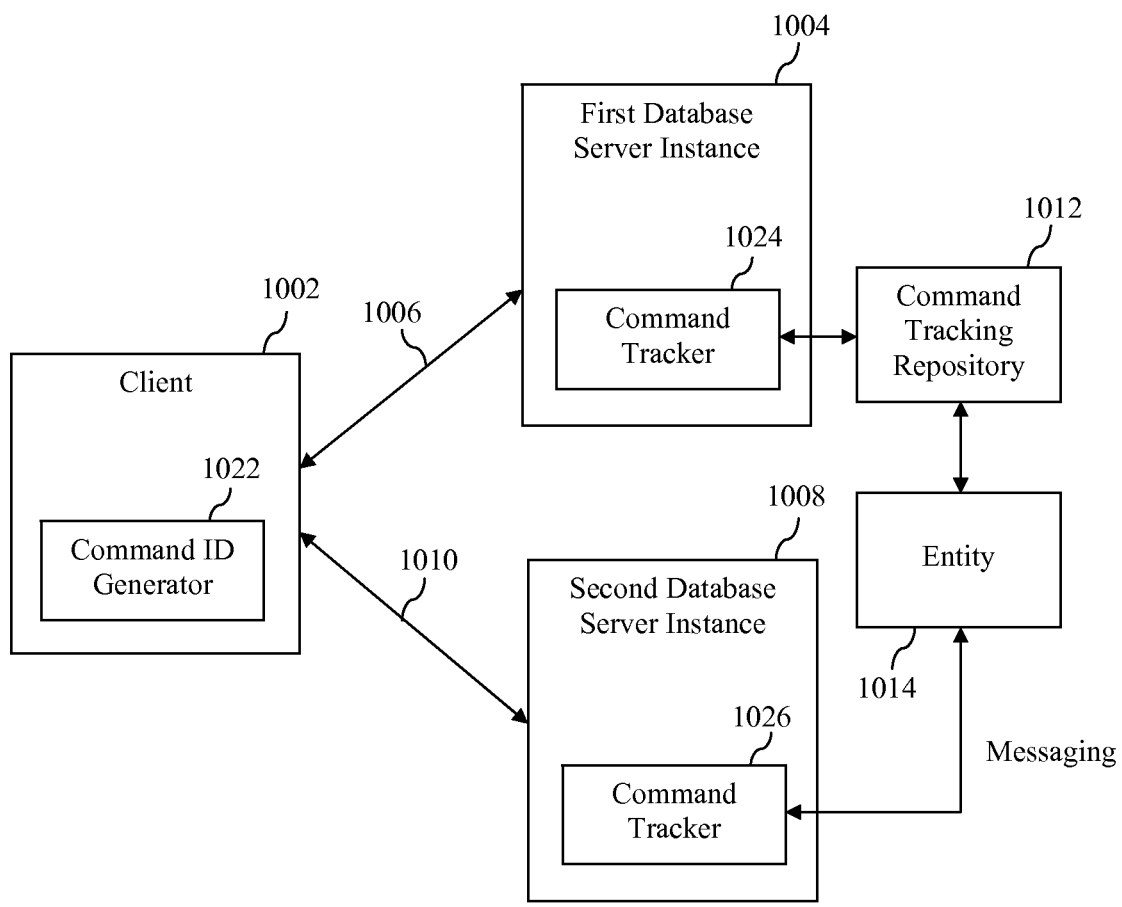
FIG. 10 is a block diagram of an example system that facilitates idempotent command execution in accordance with an alternate embodiment in which command-related information is shared between a first database server instance and a second database server instance via messaging.

FIG. 10 is a block diagram of an example system 1000 that utilizes a messaging approach to achieve the same goal. In system 1000, client 1002, command ID generator 1022, first database server instance 1004, first command tracker 1024, second database server instance 1008 and second command tracker 1026 operate in a substantially similar manner to like-named elements of system 600 and system 900. However, in system 1000, rather than using replication or a shared repository to ensure that second command tracker 1026 has access to command-related information previously stored by first command tracker 1024, a messaging approach is used. In accordance with this approach, first command tracker 1024 is configured to store command tracking data (e.g., command IDs and execution information associated with commands) in a command tracking repository 1012. When second command tracker 1026 determines that it will require access to such command tracking data, it sends messages to an entity 1014 having access to command tracking repository 1012, and entity 1014 sends the required data to second command tracker 826.

IV. Example Processor-Based System Implementation

Figure 11:
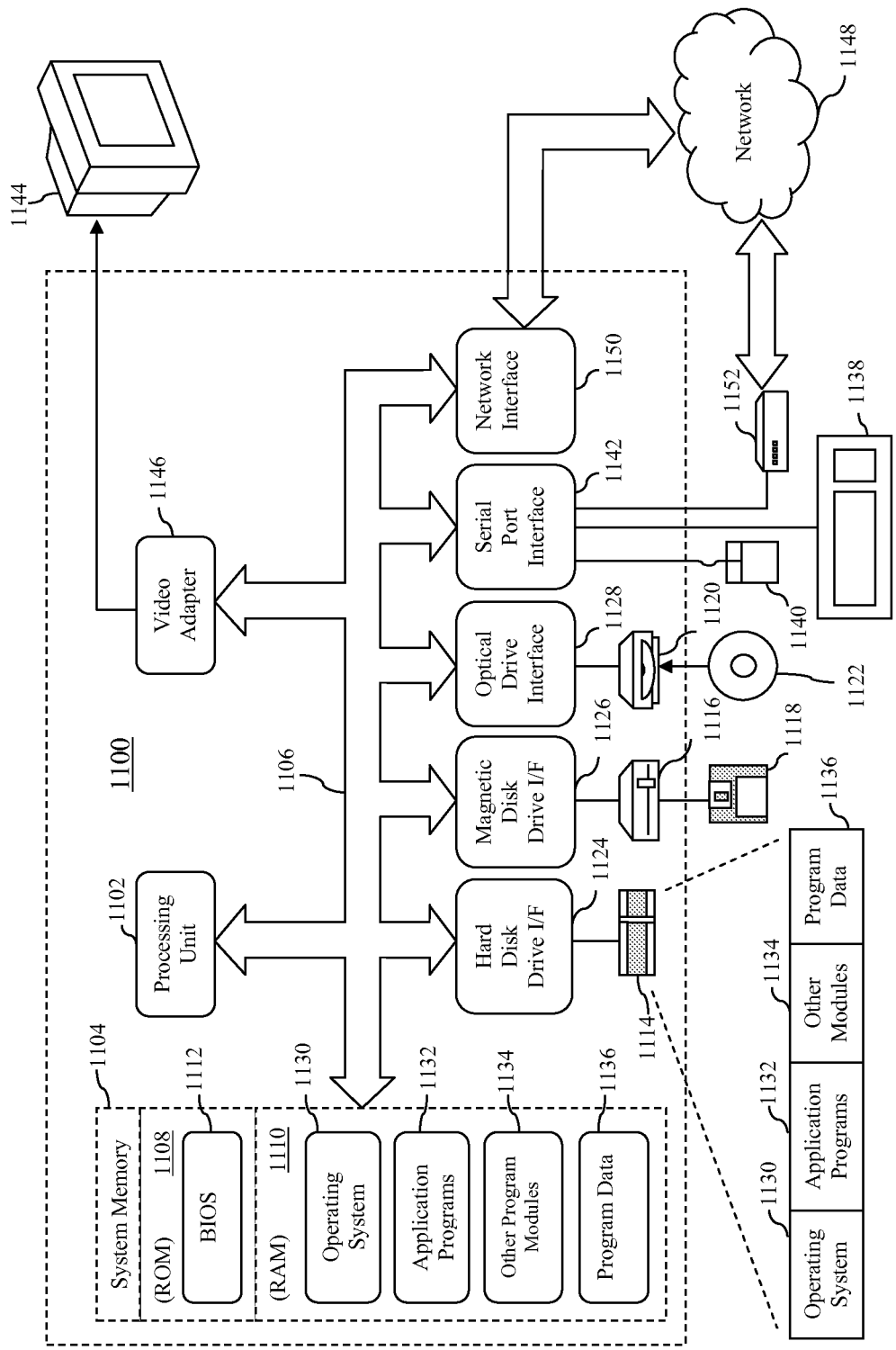
FIG. 11 is a block diagram of an example processor-based system that may be used to implement various embodiments.

FIG. 11 depicts an example processor-based computer system 1100 that may be used to implement various embodiments described herein. For example, system 1100 may be used to implement client 102, database server 104, client 602, first database server instance 604, second database server instance 608, client 902, first database server instance 904, second database server instance 908, client 1002, first database server instance 1004 or second database server instance 1008 as described above in reference to FIGS. 1-3, 5, 6, 9 and 10, as well as various sub-components thereof. The description of system 1100 provided herein is provided for purposes of illustration, and is not intended to be limiting. Embodiments may be implemented in further types of computer systems, as would be known to persons skilled in the relevant art(s).

As shown in FIG. 11, system 1100 includes a processing unit 1102, a system memory 1104, and a bus 1106 that couples various system components including system memory 1104 to processing unit 1102. Processing unit 1102 may comprise one or more processors or processing cores. Bus 1106 represents one or more of any of several types of bus structures, including a memory bus or memory controller, a peripheral bus, an accelerated graphics port, and a processor or local bus using any of a variety of bus architectures. System memory 1104 includes read only memory (ROM) 1108 and random access memory (RAM) 1110. A basic input/output system 1112 (BIOS) is stored in ROM 1108.

System 1100 also has one or more of the following drives: a hard disk drive 1114 for reading from and writing to a hard disk, a magnetic disk drive 1116 for reading from or writing to a removable magnetic disk 1118, and an optical disk drive 1120 for reading from or writing to a removable optical disk 1122 such as a CD ROM, DVD ROM, BLU-RAY™ disk or other optical media. Hard disk drive 1114, magnetic disk drive 1116, and optical disk drive 1120 are connected to bus 1106 by a hard disk drive interface 1124, a magnetic disk drive interface 1126, and an optical drive interface 1128, respectively. The drives and their associated computer-readable media provide nonvolatile storage of computer-readable instructions, data structures, program modules and other data for the computer. Although a hard disk, a removable magnetic disk and a removable optical disk are described, other types of computer-readable media can be used to store data, such as flash memory cards, digital video disks, random access memories (RAMs), read only memories (ROM), and the like.

A number of program modules may be stored on the hard disk, magnetic disk, optical disk, ROM, or RAM. These program modules include an operating system 1130, one or more application programs 1132, other program modules 1134, and program data 1136. In accordance with various embodiments, the program modules may include computer program logic that is executable by processing unit 1102 to perform any or all of the functions and features of client 102, database server 104, client 602, first database server instance 604, second database server instance 608, client 902, first database server instance 904, second database server instance 908, client 1002, first database server instance 1004 or second database server instance 1008 as described above in reference to FIGS. 1-3, 5, 6, 9 and 10, as well as various sub-components thereof, as described elsewhere herein. The program modules may also include computer program logic that, when executed by processing unit 1102, performs any of the steps or operations shown or described in reference to the flowcharts of FIGS. 4, 8 and 9 or the sequence diagram of FIG. 5.

A user may enter commands and information into system 1100 through input devices such as a keyboard 1138 and a pointing device 1140. Other input devices (not shown) may include a microphone, joystick, game controller, scanner, or the like. In one embodiment, a touch screen is provided in conjunction with a display 1144 to allow a user to provide user input via the application of a touch (as by a finger or stylus for example) to one or more points on the touch screen. These and other input devices are often connected to processing unit 1102 through a serial port interface 1142 that is coupled to bus 1106, but may be connected by other interfaces, such as a parallel port, game port, or a universal serial bus (USB).

A display 1144 is also connected to bus 1106 via an interface, such as a video adapter 1146. In addition to display 1144, system 1100 may include other peripheral output devices (not shown) such as speakers and printers.

System 1100 is connected to a network 1148 (e.g., a local area network or wide area network such as the Internet) through a network interface or adapter 1150, a modem 1152, or other suitable means for establishing communications over the network. Modem 1152, which may be internal or external, is connected to bus 1106 via serial port interface 1142.

As used herein, the terms "computer program medium" and "computer-readable medium" are used to generally refer to non-transitory media such as ROM 1108 and RAM 1110 used to implement system memory 1104, the hard disk associated with hard disk drive 1114, removable magnetic disk 1118, removable optical disk 1122, as well as other media such as flash memory cards, digital video disks, and the like.

As noted above, computer programs and modules (including application programs 1132 and other program modules 1134) may be stored on ROM 1108, RAM 1110, the hard disk associated with hard disk drive 1114, the removable magnetic disk 1118, or the removable optical disk 1122. Such computer programs may also be received via network interface 1150 or serial port interface 1142. Such computer programs, when executed by processing unit 1102, enable system 1100 to implement features of embodiments discussed herein. Accordingly, such computer programs represent controllers of system 1100.

Embodiments are also directed to computer program products comprising software stored on any computer-readable medium. Such software, when executed in one or more data processing devices, causes a data processing device(s) to operate as described herein. Embodiments may employ any computer-useable or computer-readable medium, known now or in the future. Examples of computer-readable mediums include, but are not limited to storage devices such as ROM, RAM, hard drives, floppy disks, CD ROMs, DVD ROMs, zip disks, tapes, magnetic storage devices, optical storage devices, MEMS-based storage devices, nanotechnology-based storage devices, and the like.

In alternative implementations, each of client 102, database server 104, client 602, first database server instance 604, second database server instance 608, client 902, first database server instance 904, second database server instance 908, client 1002, first database server instance 1004 or second database server instance 1008 as described above in reference to FIGS. 1-3, 5, 6, 9 and 10, as well as various sub-components thereof, may be implemented as hardware logic/electrical circuitry or firmware. In accordance with further embodiments, one or more of these components may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

V. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method, comprising:
   performing, by a first instance of a database server executing on at least one of one or more machines:
   establishing a first session with a client;
   receiving one or more commands generated by the client and a command identifier associated with each of the one or more received commands within the first session,
   each command identifier being different and being associated with only one command of the one or more received commands;
   attempting to execute each of the one or more received commands; and
   for each of the one or more received commands, storing the command identifier associated therewith in a repository along with an indication of whether the received command was executed successfully; and
   performing, by a second instance of the database server that is established in response to a broken session between the client and the first instance of the database server:
   establishing a second session with the client;
   receiving a retransmitted command from the client for execution by the database server,
   and a command identifier associated with the retransmitted command within the second session;
   determining that the command identifier associated with the retransmitted command comprises the same identifier associated with one of the one or more commands that has already been stored in the repository by the first instance before the broken session; and
   in response to at least a determination that the command identifier associated with the retransmitted command comprises the same identifier associated with the one of the one or more commands that has already been stored in the repository by the first instance before the broken session and a determination that the one of the one or more commands associated with the same command identifier was executed successfully, preventing re-execution of the retransmitted command by the second instance that was established in response to the broken session.

2. The method of claim 1, wherein the method further comprises:
   in response to the determination that the command identifier associated with the retransmitted command comprises the same identifier associated with the one of the one or more commands that has already been stored in the repository and the determination that the one of the one or more commands associated with the same command identifier was executed successfully, returning a message indicating that the one of the one or more commands was executed successfully and/or cached results generated during execution of the one of the one or more commands.

3. The method of claim 1, wherein the first session and the second session are each associated with the same virtual session, wherein storing the command identifier associated with each of the one or more received commands in the repository comprises storing the command identifiers in association with an identifier of the virtual session, and wherein determining that the command identifier associated with the retransmitted command comprises the same identifier associated with the one of the one or more commands that has already been stored in the repository by the first instance before the broken session comprises accessing stored command identifiers associated with the identifier of the virtual session.

4. The method of claim 3, wherein each of the command identifiers associated with the one or more received commands includes the identifier of the virtual session.

5. The method of claim 1, wherein the second session is established after the first session breaks.

6. The method of claim 1, wherein determining that the command identifier associated with the retransmitted command comprises the same identifier associated with the one of the one or more commands that has already been stored in the repository by the first instance before the broken session comprises:
   accessing a replicated copy of the repository that is stored in a storage medium that is accessible to the database server.

7. The method of claim 1, wherein the repository is stored in a storage medium that is accessible to the database server and wherein determining that the command identifier associated with the retransmitted command comprises the same identifier associated with the one of the one or more commands that has already been stored in the repository by the first instance before the broken session comprises:
   accessing the repository in the storage medium.

8. The method of claim 1, wherein the repository is stored in a storage medium that is not directly accessible by the database server and wherein determining that the command identifier associated with the retransmitted command comprises the same identifier associated with the one of the one or more commands that has already been stored in the repository by the first instance before the broken session comprises:
   requesting and receiving information concerning the contents of the repository from an entity that is capable of directly accessing the storage medium.

9. The method of claim 1, wherein the command identifiers associated with each of the one or more received commands are generated by a component within a database driver of the client.

10. The method of claim 1, wherein the method further comprises:
   for each of the one or more received commands that is executed successfully, committing results of the successful execution of the received command only after the command identifier associated with the received command and an indication of the successful execution of the received command has been stored in the repository.

11. A method, comprising:
   performing, by a first instance of a database server executing on at least one of one or more machines:
      receiving one or more commands generated by a client and a command identifier associated with each of the one or more received commands, each command identifier being different and being associated with only one command of the one or more received commands;
      attempting to execute each of the one or more received commands;
      for each of the one or more received commands, storing the command identifier associated therewith in a repository along with an indication of whether the received command was executed successfully; and
   performing, by a second instance of the database server that is established in response to at least one of crashing or shutting down of the one or more machines on which the first instance of the database server is running, or a problem with a network that connects the first instance of the database server to the client:
      receiving a retransmitted command from the client for execution by the database server, and a command identifier associated with the retransmitted command;
      determining that the command identifier associated with the retransmitted command comprises the same identifier associated with one of the one or more commands that has already been stored in the repository by the first instance before the broken session; and
      in response to at least a determination that the command identifier associated with the retransmitted command comprises the same identifier associated with the one of the one or more commands that has already been stored in the repository by the first instance before the broken session and a determination that the one of the one or more commands associated with the same command identifier was executed successfully, preventing re-execution of the retransmitted command by the second instance that was established in response to the broken session.

12. The method of claim 11, further comprising:
   in response to at least the determination that the command identifier associated with the retransmitted command comprises the same identifier associated with the one of the one or more commands that has already been stored in the repository and that the one of the one or more commands associated with the same command identifier was executed successfully, returning a message indicating that the one of the one or more commands was executed successfully and/or cached results generated during execution of the one of the one or more commands.

13. The method of claim 11, further comprising:
   establishing a first session with the client, wherein receiving the one or more commands generated by the client comprises receiving the one or more commands generated by the client within the first session; and
   establishing a second session with the client, wherein receiving the retransmitted command from the client and the command identifier associated with the retransmitted command comprises receiving the retransmitted command from the client and the command identifier associated with the retransmitted command within the second session.

14. The method of claim 13, wherein the first session and the second session are each associated with the same virtual session, wherein storing the command identifier associated with the received commands that are executed successfully in the repository comprises storing the command identifiers in association with an identifier of the virtual session, and wherein determining that the command identifier associated with the retransmitted command comprises the same identifier associated with the one of the one or more commands that has already been stored in the repository by the first instance before the broken session comprises accessing stored command identifiers associated with the identifier of the virtual session.

15. The method of claim 13, wherein the second session is established after the first session breaks.

16. The method of claim 11, wherein the command identifiers associated with the received one or more commands and the retransmitted command are generated by a component within a database driver of the client.

17. A system, comprising:
 a first instance of a database server executing on at least one of one or more machines, the first instance of the database server being configured to:
establish a first session with a client;
receive one or more commands generated by the client and a command identifier associated with each of the one or more received commands within the first session,
each command identifier being different and being associated with only one command of the one or more received commands,
attempt to execute each of the received commands, and
for each of the one or more received commands, store the command identifier associated therewith in a repository along with an indication of whether the received command was executed successfully; and
 a second instance of a database server executing on at least one of the one or more machines that is established in response to a broken session between the client and the first instance of the database server, the second instance of the database server being configured to:
establish a second session with the client;
receive a retransmitted command from the client for execution by the database server,
and a command identifier associated with the retransmitted command within the second session,
determine that the command identifier associated with the retransmitted command comprises the same identifier associated with one of the one or more commands that has already been stored in the repository by the first instance before the broken session, and
in response to at least a determination that the command identifier associated with the retransmitted command comprises the same identifier associated with the one of the one or more commands that has already been stored in the repository by the first instance before the broken session and a determination that the one of the one or more commands associated with the same command identifier was executed successfully, prevent re-execution of the retransmitted command.

18. The system of claim 17, wherein the first session and the second session are each associated with the same virtual session, wherein the first instance of the database server is configured to store the command identifier for each of the one or more received commands in the repository by storing the command identifiers in association with an identifier of the virtual session, and wherein the second instance of the database server is configured to determine that the command identifier associated with the retransmitted command comprises the same identifier associated with the one of the one or more commands that has already been stored in the repository by the first instance before the broken session by accessing stored command identifiers associated with the identifier of the virtual session.

19. The system of claim 18, wherein each of the command identifiers associated with the one or more received commands includes the identifier of the virtual session.

20. The method of claim 14, wherein each of the command identifiers associated with the one or more received commands includes the identifier of the virtual session.

* * * * *